(12) United States Patent
Shimizu

(10) Patent No.: US 7,715,038 B2
(45) Date of Patent: May 11, 2010

(54) METHOD AND APPARATUS TO AUTHENTICATE IMAGE DATA THAT INCLUDES A DIGITAL SIGNATURE

(75) Inventor: Yasushi Shimizu, Narashino (JP)

(73) Assignee: Canon Kabushiki Kaisha (JP)

( * ) Notice: Subject to any disclaimer, the term of this patent is extended or adjusted under 35 U.S.C. 154(b) by 1191 days.

(21) Appl. No.: 11/294,128

(22) Filed: Dec. 5, 2005

(65) Prior Publication Data

US 2006/0119891 A1    Jun. 8, 2006

(30) Foreign Application Priority Data

Dec. 3, 2004  (JP) .............................. 2004-351512
Nov. 16, 2005  (JP) .............................. 2005-322060

(51) Int. Cl.
*G06F 3/12* (2006.01)
*G06K 15/00* (2006.01)

(52) U.S. Cl. ..................................... 358/1.15; 358/1.16

(58) Field of Classification Search ................ 358/1.15, 358/1.16, 1.2, 2.1, 1.14, 526, 538, 462, 437, 358/1.18; 382/182, 184; 713/176, 178; 380/55, 380/243

See application file for complete search history.

(56) References Cited

U.S. PATENT DOCUMENTS

2003/0164973 A1*  9/2003  Hisatomi et al. ........... 358/1.15
2005/0071283 A1*  3/2005  Randle et al. ................. 705/75

FOREIGN PATENT DOCUMENTS

JP    2002-218220 A    8/2002

* cited by examiner

*Primary Examiner*—Dov Popovici
*Assistant Examiner*—Thomas J Lett
(74) *Attorney, Agent, or Firm*—Rossi, Kimms & McDowell LLP

(57) ABSTRACT

Provided is an image forming apparatus control method which, when an image is to be formed from image data with a digital signature, safely manages the image formed from the image data even if it is impossible to certify whether the image data is tampered. When receiving a request for formation of an image of image data with a digital signature from a personal computer, this image input/output apparatus requests a digital signature issue/authentication server to certify the authenticity of the signature data. On the basis of the certification result, the apparatus adds, to the output image, an additional image indicating that the original image is tampered, or an additional image indicating that whether the original image is tampered cannot be certified.

11 Claims, 17 Drawing Sheets

SYNTHETIC IMAGE

SYNTHETIC IMAGE OUTPUT
BY DOWNSIZING ORIGINAL IMAGE

SYNTHETIC IMAGE OUTPUT
BY CHANGING ORIGINAL IMAGE
INTO MONOCHROMATIC IMAGE

METHOD AND APPARATUS TO AUTHENTICATE IMAGE DATA THAT INCLUDES A DIGITAL SIGNATURE

FIELD OF THE INVENTION

The present invention relates to an image forming apparatus and a control method of the same and, more particularly, to an image forming apparatus such as a digital copying machine or printer having a function of certifying the validity of digital data protected by, e.g., a digital signature or time stamp, and a control method of the same.

BACKGROUND OF THE INVENTION

With recent decreases in costs of storage media such as DRAMs and HDDs, it is becoming possible to inexpensively store a large amount of image data in an image forming apparatus. This makes it possible to add a storage (filing) function to the conventional image forming apparatuses having only functions of printing out data onto sheets of paper and outputting image data read from originals. While the convenience improves because a large amount of images can be stored in an image forming apparatus having a storage device, a new security problem arises. That is, the possibility that image data on the storage device is tampered, erased, or illegally output by an unauthorized third party is pointed out. To prevent this problem, the conventional image forming apparatuses protect unauthorized access to image data by personal authentication using a password or the like (e.g., Japanese Patent Laid-Open No. 2002-218220). Also, with the recent progress of time business, a technique which certifies the validity of data by communication with a time stamp authority or certificate authority on the Internet has been developed and put into practical use. For example, a time stamp method complying with RFC3161 is beginning to be used.

When digital data is to be protected by certifying the validity of data by communication with a certificate authority or time stamp authority on the Internet, a user sometimes wants to output the contents of data in accordance with the degree of urgency even if:

1) the data to be output is not authorized by the certificate authority because, e.g., the data is tampered.

2) the system of the authentication server is not operating for some reason, or 3) the user cannot communicate with the authentication server for some reason such as a network failure.

Under any of conditions 1) to 3) above, however, the output result of image data may be abused because the data is tampered, or data whose validity is not certified by the certificate authority or time stamp authority may be carelessly distributed.

SUMMARY OF THE INVENTION

The present invention has been made to solve the problems of the conventional techniques described above, and has as its object to provide an image forming apparatus in which when an image is to be formed from image data with a digital signature, if the image data is tampered, or if whether the image data is tampered is not certified (if the authenticity of the image data is not certified), the user can safely manage an image formed from this image data.

To achieve the above object, an image forming apparatus of an embodiment according to the present invention has the following arrangement. That is, an image forming apparatus connectable to a network is characterized by comprising an identification unit adapted to identify whether a digital signature is added to image data, an authenticity inquiring unit adapted to inquire of a signature authentication server connected to the network about the authenticity of the image data, if the identification unit identifies that the digital signature is added to the image data, a determination unit adapted to determine whether the image data is valid, on the basis of information transmitted from the signature authentication server in response to the inquiry or the presence/absence of a response from the signature authentication server, and an image forming unit adapted to form synthetic image data by adding, to the image data, data corresponding to a determination result from the determination unit, and form a synthetic image from the synthetic image data.

For example, the digital signature preferably includes a time stamp.

For example, if the determination result shows that the image data is found to be a fake by the signature authentication server, the image forming unit preferably forms synthetic image data by adding data corresponding to the determination result to the image data, such that information indicating that the image is probably tampered is formed on the synthetic image.

For example, if the determination result shows that the validity of the image data cannot be certified because no response is returned from the signature authentication server within a predetermined time, the image forming unit preferably forms synthetic image data by adding data corresponding to the determination result to the image data, such that information indicating that the validity of the image cannot be certified is formed on the synthetic image.

For example, if the determination result shows that the image data is found to be real data by the signature authentication server, the image forming unit preferably does not form any synthetic image data, such that an image is formed only from the image data.

For example, if the determination result shows that the image data is found to be a fake by the signature authentication server, or that the validity of the image data cannot be certified, the image forming unit preferably changes the image data into monochromatic image data, and forms synthetic image data by adding data corresponding to the determination result to the monochromatic image data.

For example, if the determination result shows that the image data is found to be a fake by the signature authentication server, or that the validity of the image data cannot be certified, the image forming unit preferably extracts a portion of the image data, and forms synthetic image data by adding data corresponding to the determination result to the extracted image data.

For example, if the determination result shows that the image data is found to be a fake by the signature authentication server, or that the validity of the image data cannot be certified, the image forming unit preferably downsizes the image data, and forms synthetic image data by adding data corresponding to the determination result to the downsized image data.

For example, if the determination result shows that the image data is found to be a fake by the signature authentication server, or that the validity of the image data cannot be certified, the image forming unit preferably changes a density of the image data, and forms synthetic image data by adding data corresponding to the determination result to the image data having the changed density.

For example, if the determination result shows that the image data is found to be a fake by the signature authentication server, or that the validity of the image data cannot be certified, the image forming unit preferably downsizes the image data, performs processing such that a plurality of downsized image data are printed on one printing medium, and forms synthetic image data by adding data corresponding to the determination result.

To achieve the above object, a control method of an image forming apparatus of an embodiment according to the present invention has the following steps. That is, a control method of an image forming apparatus connectable to a network is characterized by comprising an identification step of identifying whether a digital signature is added to image data, an authenticity inquiring step of inquiring of a signature authentication server connected to the network about the authenticity of the image data, if the digital signature is identified to be added to the image data in the identification step, a determination step of determining whether the image data is valid, on the basis of information transmitted from the signature authentication server in response to the inquiry or the presence/absence of a response from the signature authentication server, and an image formation step of forming synthetic image data by adding, to the image data, data corresponding to a determination result from the determination step, and forming a synthetic image from the synthetic image data.

To achieve the above object, a control program for controlling an image forming apparatus of an embodiment according to the present invention has the following program codes. That is, a control program for controlling an image forming apparatus connectable to a network is characterized by comprising a program code of an identification step of identifying whether a digital signature is added to image data, a program code of an authenticity inquiring step of inquiring of a signature authentication server connected to the network about the authenticity of the image data, if the digital signature is identified to be added to the image data in the identification step, a program code of a determination step of determining whether the image data is valid, on the basis of information transmitted from the signature authentication server in response to the inquiry or the presence/absence of a response from the signature authentication server, and a program code of an image formation step of forming synthetic image data by adding, to the image data, data corresponding to a determination result from the determination step, and forming a synthetic image from the synthetic image data.

In the image forming apparatus and the control method of the same according to the present invention, when an image is to be formed from image data with a digital signature by the image forming apparatus, if this image data is tampered, or if whether the image data is tampered is not certified (if the authenticity of the image data is not certified), this information can be added to the output image. On the basis of this information, therefore, the user can safely manage the image formed from the image data. Accordingly, the user can prevent careless distribution of the output image, and can carefully handle the output image by recognizing that the original image is probably tampered.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

A preferred embodiment of the present invention will now be described in detail in accordance with the accompanying drawings. Note that in the following explanation, an image input/output apparatus connectable to a network and including a storage device such as a hard disk will be taken as an example of an image forming apparatus. Note also that in the following explanation, a system in which the image input/output apparatus described above, a personal computer, a digital signature issue/authentication server, and the like are connected to a network will be taken as an example.

First Embodiment

Figure 1:
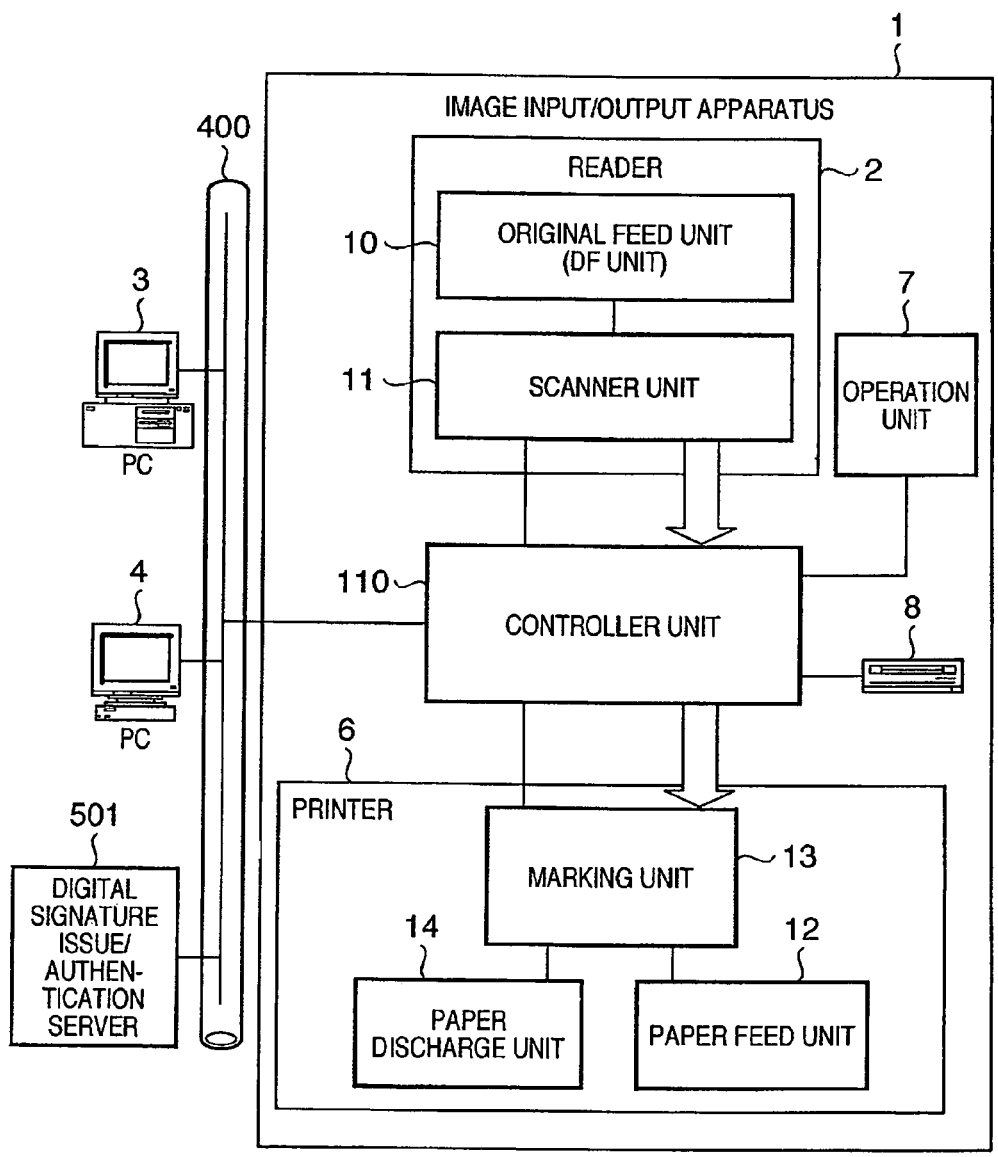
FIG. 1 is a block diagram showing an example of an image input/output apparatus as an embodiment of an image forming apparatus according to the present invention.

Arrangement of Image Input/Output Apparatus: FIG. 1

FIG. 1 is a block diagram showing an example of the arrangement of an image input/output apparatus incorporating a controller unit as an electronic component according to the present invention. An image input/output apparatus 1 is connected to host computers (in this embodiment, first and second host computers 3 and 4) by a LAN (Local Area Network) 400 such as Ethernet (registered trademark). Although a digital signature issue/authentication server 501 is also connected to the LAN 400, details of the network configuration will be explained later with reference to FIG. 5.

That is, the image input/output apparatus 1 includes a reader 2 which reads image data, a printer 6 which outputs image data, an operation unit 7 including a keyboard for performing image data input/output operations and a liquid crystal panel for displaying image data, various functions, and the like, and a controller unit 110 which is a single electronic component. The controller unit 110 includes a hard disk 8 in which control programs, image data, and the like are prewritten, and is connected to the constituent elements described above to control them.

In addition, the reader 2 has an original feed unit 10 for conveying originals, and a scanner unit 11 for optically reading an original image and converting it into image data as an electrical signal. The printer 6 has a paper feed unit 12 including a plurality of paper feed cassettes for accommodating printing sheets, a marking unit 13 for transferring and fixing image data onto a printing sheet, and a paper discharge unit 14 for sorting or stapling printed sheets and discharging them outside.

Figure 2:
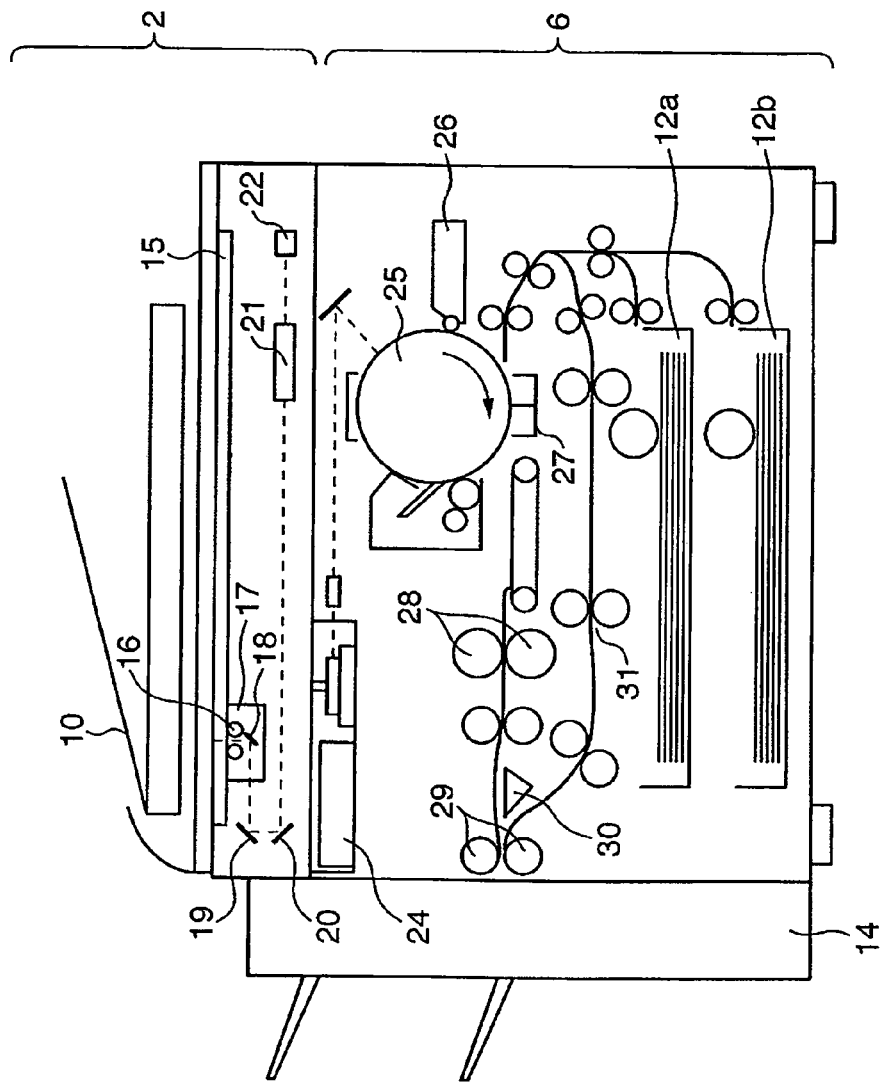
FIG. 2 is a view showing an example of the internal arrangement of the image input/output apparatus.

[Details of Image Input/Output Apparatus: FIG. 2]

FIG. 2 is an internal structure showing details of the reader 2 and printer 6 of the image input/output apparatus 1. Referring to FIG. 2, the reader 2 is mounted on the printer 6. In the reader 2, original sheets stacked on the original feed unit 10 are fed one by one in the stacked order from the top one onto platen glass 15. After a predetermined read operation by the scanner unit 11 is completed, the read original sheet is discharged from the platen glass 15 to the original feed unit 10.

In the scanner unit 11, when an original sheet is conveyed onto the platen glass 15, a lamp 16 is turned on, and the movement of an optical unit 17 is started to irradiate and scan the original sheet from below. The reflected light from the original sheet is guided to a CCD image sensor (to be simply referred to as a "CCD" hereinafter) 22 via a plurality of mirrors 18 to 20 and a lens 21. In this manner, the scanned original image is read by the CCD 22.

Figure 3:
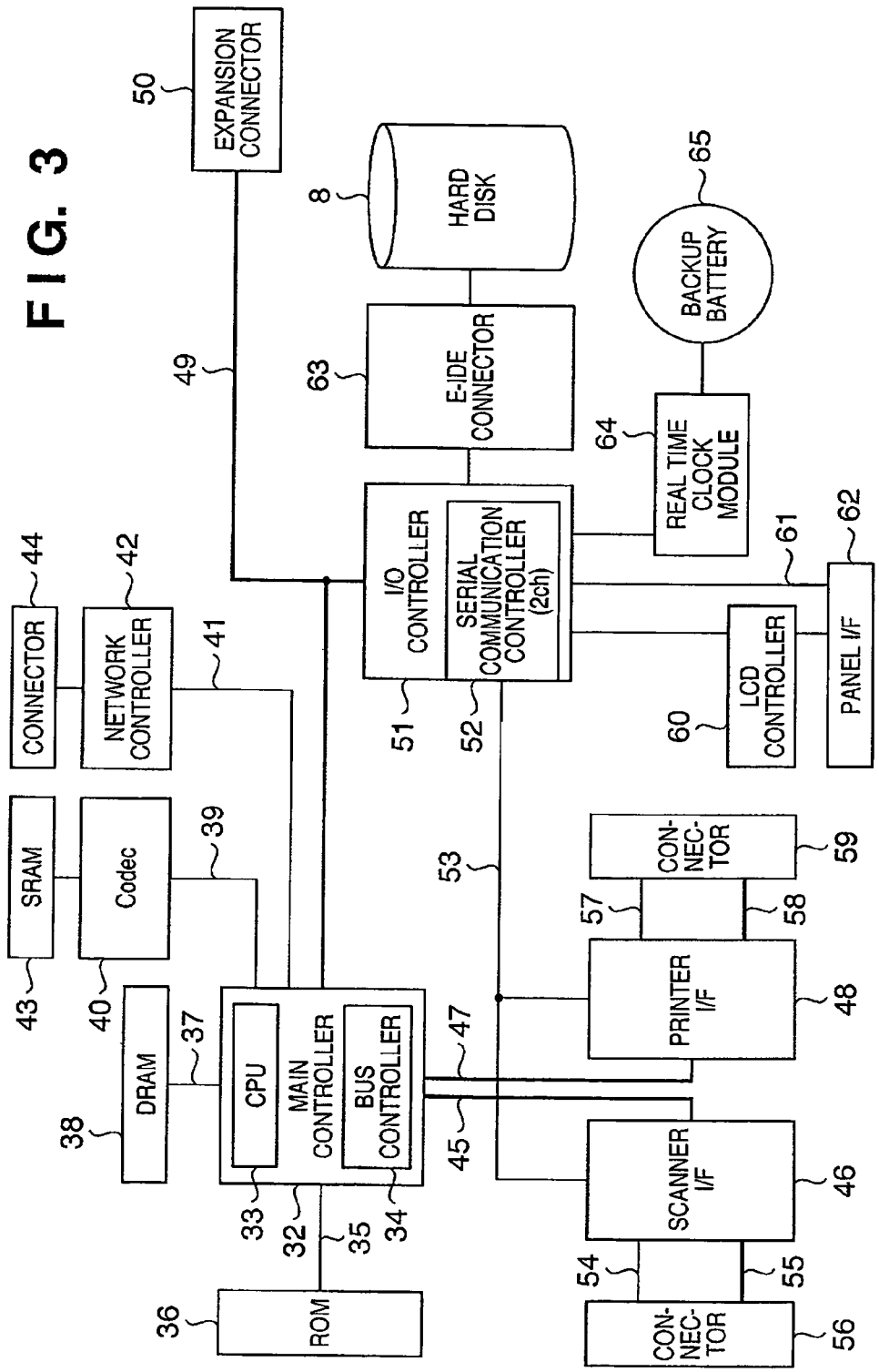
FIG. 3 is a block diagram showing details of a controller unit as an electronic component according to the present invention.

The image data read by the CCD 22 undergoes predetermined processing, and is transferred to the controller unit 110 (FIG. 1, not shown in FIG. 2). Alternatively, after an original is placed on the original platen, the lamp 16 is similarly turned on, and the movement of the optical unit 17 is started to irradiate and scan the original sheet from below. In this way, the scanned original image can be read by the CCD 22. The image data output from the reader 2 following the above procedure is supplied to the controller unit 110 via a connector 56 (FIG. 3, not shown in FIG. 2).

In the printer 6, a laser beam corresponding to the output image data from the controller unit 110 is emitted from a laser emitter 24 which is driven by a laser driver 23. An electrostatic latent image corresponding to the laser beam is formed on a photosensitive drum 25 of the marking unit 13, and a toner is adhered to this electrostatic latent image by a developing device 26.

At the timing synchronized with the start of emission of the laser beam, a printing sheet is fed from the paper feed unit 12 (a paper feed cassette 12a or 12b) and conveyed to a transfer unit 27, and the toner sticking to the photosensitive drum 25 is transferred onto this printing sheet. The printing sheet on which the image data is transferred is conveyed to a fixing unit 28 where the image data is fixed on the printing sheet by heat and pressure.

When the image data is to be printed on one side of the printing sheet, the printing sheet passing through the fixing unit 28 is directly discharged to the paper discharge unit 14 by paper discharge rollers 29. The paper discharge unit 14 sorts the discharged printing sheets by stacking them, and staples the sorted printing sheets if necessary.

When the image data is to be printed on the two sides of the printing sheet, after the printing sheet is conveyed to the paper discharge rollers 29, the rotation of the paper discharge rollers 29 is reversed. Consequently, the printing sheet is guided to a paper refeed convey path 31 by a flapper 30, and conveyed to the transfer unit 27 in the same manner as above.

The controller unit 110 is made up of a single electronic component as described above. The controller unit 110 has a scanner function of converting image data read by the reader 2 into a code and transmitting this code to the first and second host computers 3 and 4 across the LAN 400, a printer function of converting code data received from the host computers 3 and 4 across the LAN 400 into image data and outputting this image data to the printer 6, and other functional blocks.

[Details of Controller Unit: FIG. 3]

FIG. 3 is a block diagram showing details of the controller unit 110. That is, a main controller 32 incorporates a CPU 33, a bus controller 34, and functional blocks including various controller circuits (to be described later). In addition, the main controller 32 is connected to a ROM 36, DRAM 38, codec 40, and network controller 42 via a ROM I/F 35, DRAM I/F 37, codec I/F 39, and network I/F 41, respectively.

The ROM 36 stores various control programs to be executed by the CPU 33 of the main controller 32, and arithmetic data. The DRAM 38 is used as a work area for the operation of the CPU 33, and as an image data storage area. The codec 40 compresses raster image data stored in the DRAM 38 by a well-known compression method such as MH, MR, MMR, or JBIG, and expands compressed data into a raster image. Also, an SRAM 43 is connected to the codec 40, and used as a temporary work area of the codec 40.

The network controller 42 performs a predetermined control operation together with the LAN 400 across a connector 44. The main controller 32 is connected to a scanner I/F 46 and printer I/F 48 via a scanner bus 45 and printer bus 47, respectively. The main controller 32 is also connected to an expansion connector 50 for connecting an expansion board and to an input/output controller (I/O controller) 51 via a general-purpose high-speed bus 49 such as a PCI bus.

The I/O controller 51 has two channels of a start-stop serial communication controller 52 which exchanges control commands with the reader 2 and printer 6. The serial communication controller 52 is connected to the scanner I/F 46 and printer I/F 48 via an I/O bus 53.

The scanner I/F 46 is connected to the scanner connector 56 via a first start-stop serial I/F 54 and first video I/F 55. The scanner connector 56 is connected to the scanner unit 11 of the reader 2 (FIG. 1). The scanner I/F 46 performs a desired binarization process and a magnification changing process in the main scan direction and/or the sub scan direction on image data received from the scanner unit 11. Also, the scanner I/F 46 generates a control signal on the basis of a video signal supplied from the scanner unit 11, and transfers the control signal to the main controller 32 via the scanner bus 45.

The printer I/F 48 is connected to a printer connector 59 via a second start-stop serial I/F 57 and second video I/F 58. The printer connector 59 is connected to the marking unit 13 of the printer 6. The printer I/F 48 smoothes output image data from the main controller 32, and outputs the smoothed image data to the marking unit 13. Also, the printer I/F 48 generates a control signal on the basis of a video signal supplied from the marking unit 13, and outputs the control signal to the printer bus 47.

The CPU 33 operates on the basis of the control programs loaded from the ROM 36 via the ROM I/F 35. For example, the CPU 33 interprets PDL (Page Description Language) data received from the first and second host computers 3 and 4, and rasterizes the data into raster image data.

The bus controller 34 controls transfer of data input to and output from the scanner I/F 46, the printer I/F 48, and external apparatuses connected to the expansion connector 50 and the like, and performs arbitration upon bus contention or controls DMA data transfer. That is, the bus controller 34 controls, e.g., the data transfer between the DRAM 38 and codec 40, the data transfer from the scanner 5 to the DRAM 38, and the data transfer from the DRAM 38 to the marking unit 13 described above by DMA transfer.

The I/O controller 51 is connected to a panel I/F 62 via an LCD controller 60 and key input bus 61. The panel I/F 62 is connected to the operation unit 7. The I/O controller 51 is connected to the hard disk drive 8 via an E-IDE connector 63, and connected to a real-time clock module 64 which updates and saves the date and time managed in the apparatus. Note that the real-time clock module 64 is connected to and backed up by a backup battery 65.

Figure 4:
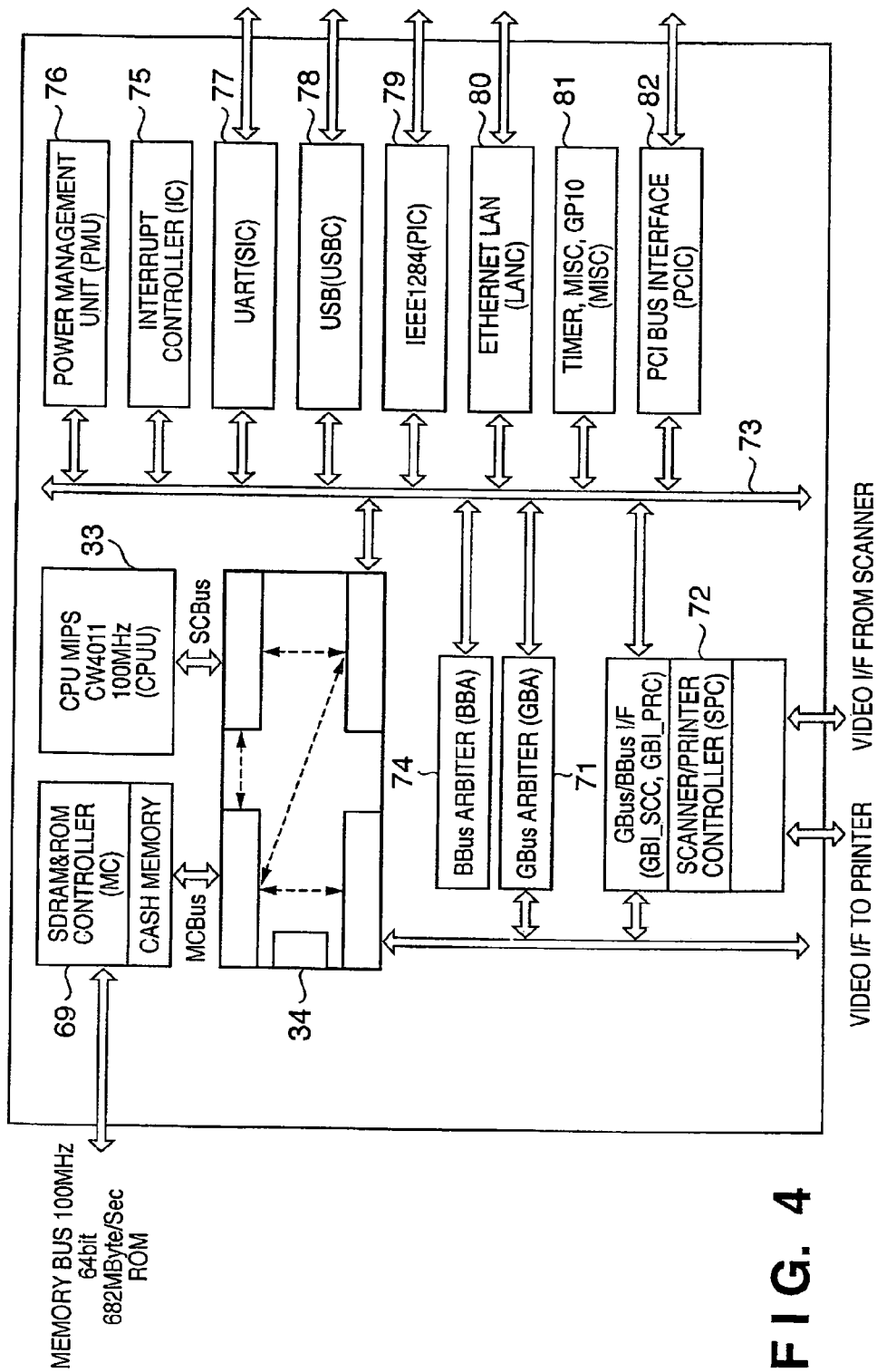
FIG. 4 is a block diagram showing details of a main controller.

[Details of Interior of Main Controller: FIG. 4]

FIG. 4 is a block diagram showing details of the interior of the main controller 32. The bus controller 34 is made up of 4×4 64-bit cross bus switches. The bus controller 34 is connected to the CPU 33 via a 64-bit processor bus (P bus) 67, and is also connected to a memory controller 69 having a cache memory 69a via a local bus (M bus) 68 dedicated to the memories. The memory controller 69 is connected to the memories such as the ROM 36 and DRAM 38 and controls the operations of these memories.

In addition, the bus controller 34 is connected to a G bus arbiter 71 and scanner/printer controller 72 via a graphic bus (G bus, 100 MHz, 64 bits, 800 MBytes/sec) 70. The bus controller 34 is also connected to a B bus arbiter 74, the G bus arbiter 71, an interrupt controller, and various functional blocks (a power management unit 76, a serial I/F controller 77 such as UART, a USB (Universal Serial Bus) controller 78, a parallel I/F controller 79 such as IEEE1284, a LAN controller 80, a general-purpose input/output controller 81, a PCI bus I/F 82 which controls an I/F operation between the B bus 73 and a PCI bus as an external bus, and the scanner/printer controller 72) via an input/output bus (a B bus, 50 MHz, 32 bits, 200 Mbytes/sec) 73.

The B bus arbiter 74 is arbitration which performs cooperative control on the B bus 73. The B bus arbiter 74 accepts bus use requests to the B bus 73, performs arbitration, and gives use permission to one selected master, thereby inhibiting two or more masters from simultaneously performing bus access. Note that the arbitration method has three priority stages, and a plurality of masters are allocated to each priority.

The interrupt controller 75 accumulates interrupts from outside the individual functional blocks and the controller unit 110 described above, and redistributes the interrupts to the controllers 72 and 77 to 82 and a nonmaskable interrupt (NMI).

The power management unit 76 manages the power of each functional block, and monitors the power consumption of the controller unit 110 as an electronic component made up of one chip. That is, the controller unit 110 is made up of a large-scale ASIC (Application Specific Integrated Circuit) incorporating the CPU 33. Therefore, if all the functional blocks operate at the same time, a large amount of heat is generated, and this may destroy the controller unit 110 itself.

To prevent an event like this, the power management unit 76 manages the power consumption of each functional block, and accumulates the power consumption amount of each functional block as a power management level. The power management unit 76 then sums up the power consumption amounts of the individual functional blocks, and comprehensively controls the power consumption amounts of the individual functional blocks such that the total power consumption amount does not exceed the limit power consumption.

The G bus arbiter 71 performs cooperative control on the G bus 70 by the central arbitration method, and has a request signal and permission signal dedicated to each bus master. Note that as a method of giving priority to a bus master, it is possible to designate one of the fair arbitration mode in which all bus masters have the same priority and bus rights are fairly given to these bus masters, and the priority arbitration mode in which a given bus master is allowed to preferentially use the bus.

Figure 5:
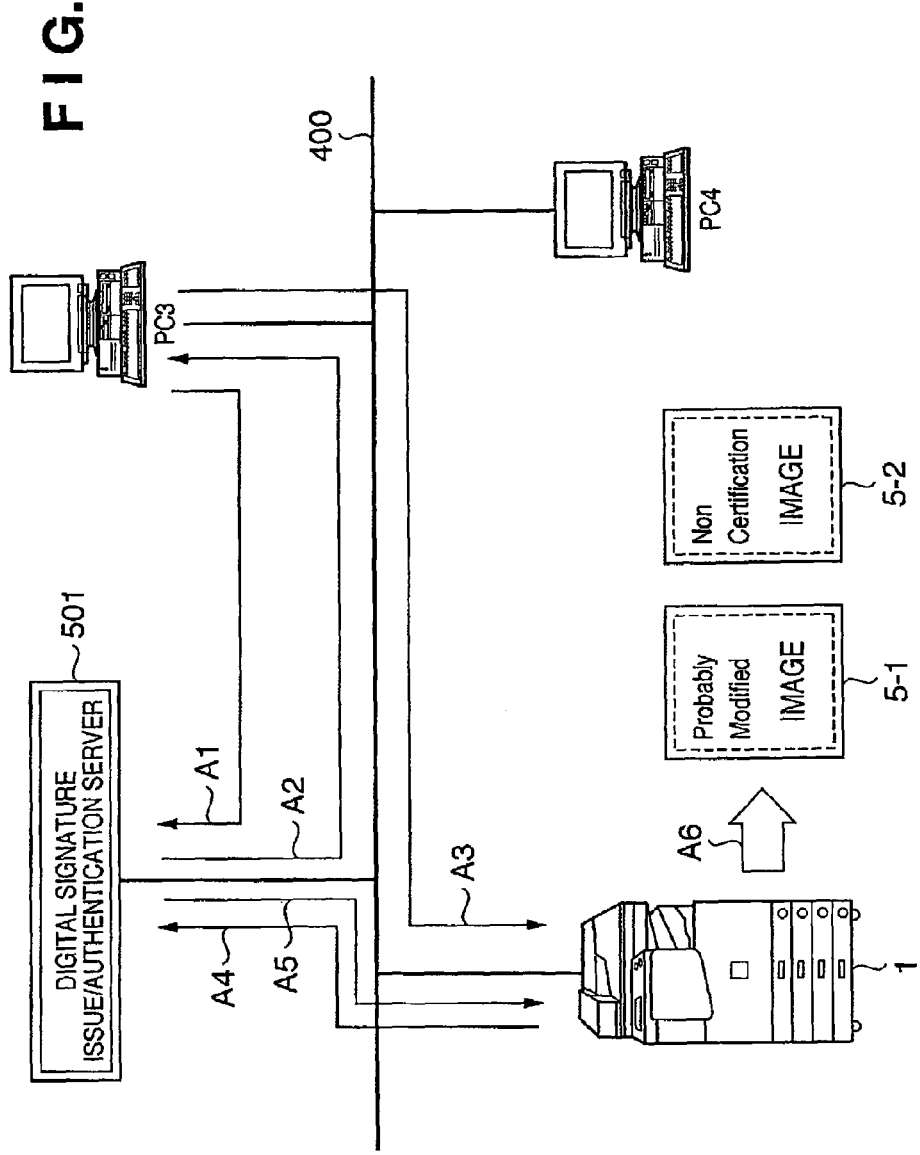
FIG. 5 is a block diagram showing the arrangement, on a LAN, of the image input/output apparatus as the image forming apparatus according to the present invention, a digital signature issue/authentication server, and client PCs.

[Network Configuration: FIG. 5]

Figure 6:
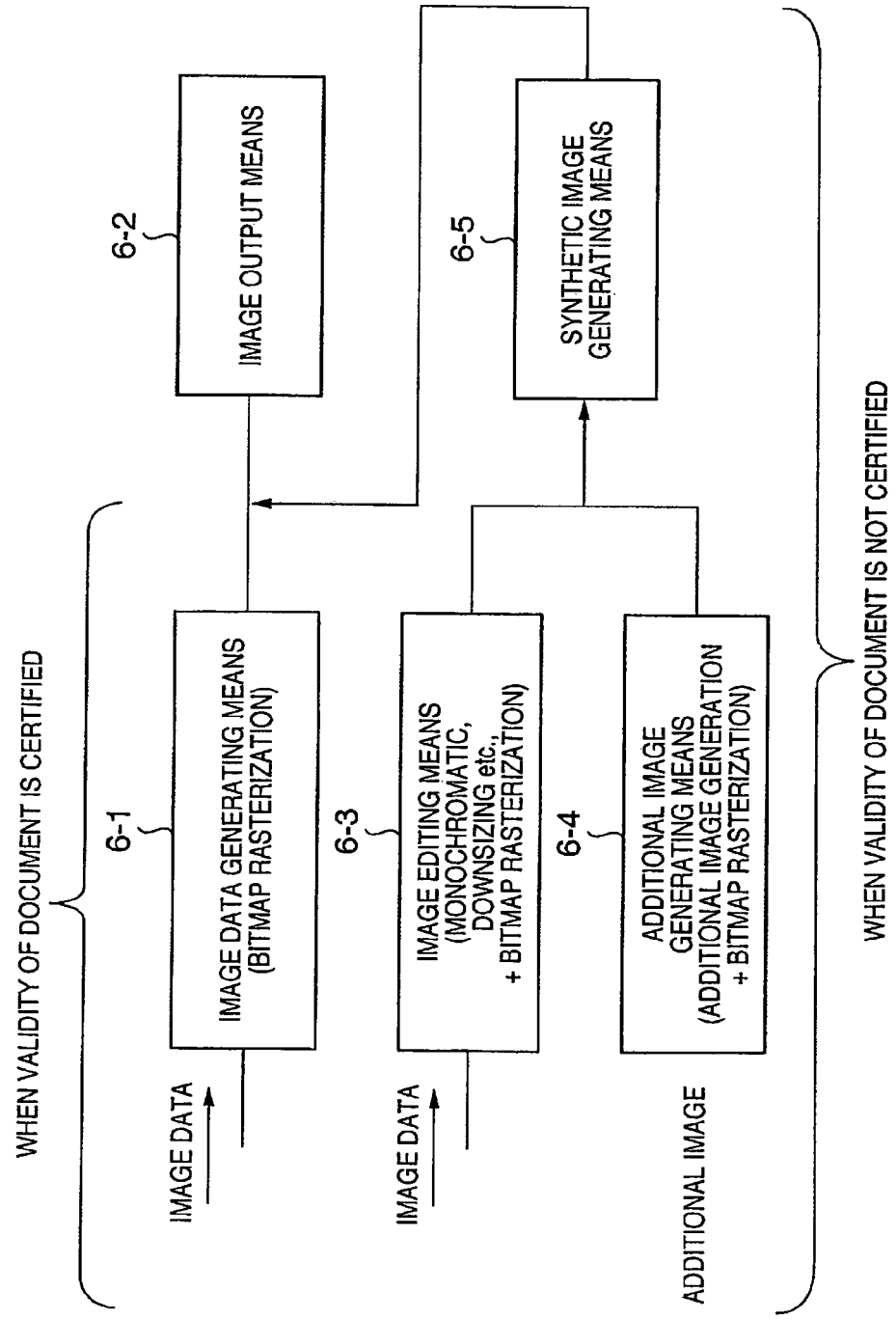
FIG. 6 is a block diagram for explaining processes when the validity of a document is certified and is not certified.

A practical embodiment of the present invention will be explained below with reference to FIGS. 5, 6, and 7 by taking the image input/output apparatus 1 having the above arrangement as an example. FIG. 5 shows a practical network configuration including the image input/output apparatus 1 according to the embodiment of the present invention.

The image input/output apparatus 1, the digital signature issue/authentication server 501, and the PCs 3 and 4 of users who use digital signatures and the authentication service are connected to the network.

A digital signature is encrypted signature information which is added to warrant the validity of a digital document. More specifically, a digital signature is encrypted digital data which proves to any third party that data has not been tampered from the time at which a time stamp is given.

FIG. 5 will be explained below.

(1) Digital Signature Acquisition Request (A1 in FIG. 5)

At the PC 3, the user can freely create a document by using an application on the personal computer. To protect the document created on the PC 3, the user encrypts a digital signature acquisition request and the hash value of the created document, and transmits the encrypted data to the digital signature issue/authentication server 501 having the digital signature service.

(2) Transmission of Generated Signature Information (A2 in FIG. 5)

The digital signature issue/authentication server 501 generates signature information requested by the user with respect to the hash value of the document, and transmits the generated signature information to the PC 3. In this embodiment, the hash value received from the PC 3 is embedded in the signature information generated by the digital signature issue/authentication server 501. However, the digital signature issue/authentication server 501 may also generate a hash value to the document. In this case, instead of the hash value of the document created by the PC 3, the document itself and the digital signature acquisition request are transmitted to the digital signature issue/authentication server 501.

(3) Printing Request for Image Data with Signature Information (A3 in FIG. 5)

At the PC 3, the user adds the signature information acquired from the digital signature issue/authentication server 501 to the created document. This service is open and provided to the public as a known technique called a digital signature or time stamp service together with the application on the PC 3. Then, the user transmits the document (image data) with the digital signature formed by using the digital signature service from the PC 3 to the image input/output apparatus 1, and requests image formation (printing).

(4) Request for Certification of Document (A4 in FIG. 5)

The image input/output apparatus 1 transmits the received document with the digital signature to the digital signature issue/authentication server 501, and requests certification of the authenticity of the document.

(5) Report of Document Authenticity Certification Result (A5 in FIG. 5)

The digital signature issue/authentication server 501 compares a hash value generated from the received document with the hash value embedded in the digital signature, and reports the document authenticity certification result to the image input/output apparatus 1.

(6) Execution of Printing (Formation of Image with Digital Signature Certification)(A6 in FIG. 5)

On the basis of the document authenticity certification result, the image input/output apparatus 1 forms synthetic image data added to the image data, and outputs a synthetic image. Output example 5-1 indicates a case in which it is determined that the data is tampered, and output example 5-2 indicates a case in which it is determined that certification is impossible. If it is determined that the data is not tampered, an image is output on the basis of the original image data without generating any synthetic image data.

Note that in communication between the PC 3 and digital signature issue/authentication server 501 in A1 and A2 of FIG. 5, cryptographic communication using the known SSL (Secured Socket Layer) or the like is preferably performed. Likewise, cryptographic communication is also preferably used in communication between the PC 3 and image input/output apparatus 1 in A3 of FIG. 5, and in communication between the image input/output apparatus 1 and digital signature issue/authentication server 501 in A4 and A5 of FIG. 5.

As described above, the present invention relates to the processing of the image input/output apparatus 1 when the user requests printing of a document with a signature formed by using the digital signature service as described above from the PC 3 to the image input/output apparatus 1. A practical example of this processing will be described in detail below with reference to a flowchart shown in FIG. 7.

[Image Formation Process: FIG. 7]

The processing of the controller unit 110 in the image input/output apparatus 1 will be explained below with reference to FIG. 7. The CPU 33 executes this processing on the basis of the control programs stored in the ROM 36 by using the DRAM 38 as a work area and as an area for storing image data while controlling the individual units. Note that in the following explanation of the processing, it is assumed that the digital signature issue/authentication server 501 or the user presets the form of an output image when the contents of a document are tampered, or the form of an output image when connection to the digital signature issue/authentication server 501 is impossible.

Figure 7:
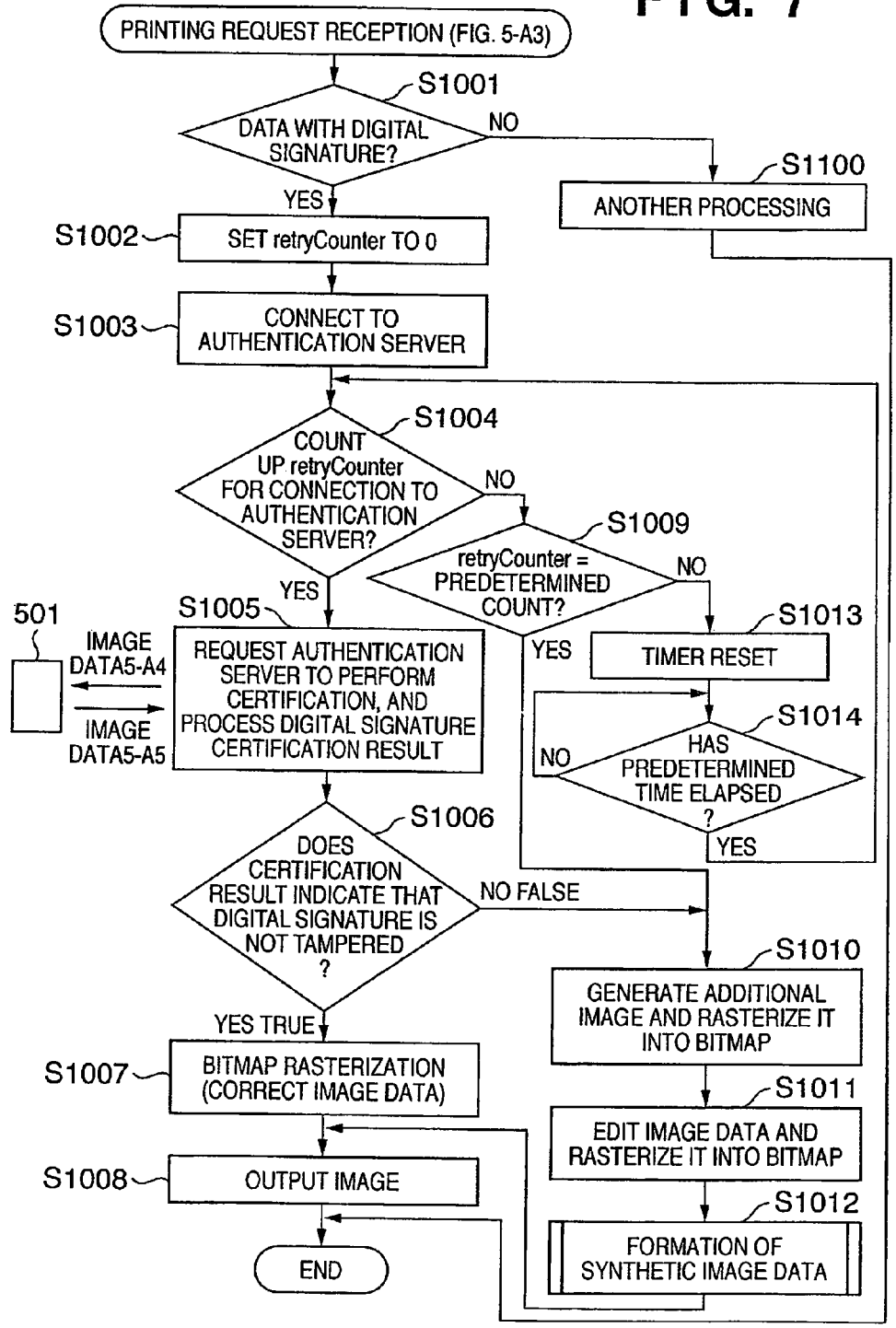
FIG. 7 is a flowchart for explaining the processing of the image input/output apparatus.

The processing shown in FIG. 7 is started when the controller unit 110 has received a document (image data) printing request from the PC 3 via the internal network controller 42 (A3 in FIG. 5).

First, in step S1001, the CPU 33 certifies whether the document from the PC 3 is data with a digital signature. If the CPU 33 determines in step S1001 that no digital signature data is added to the document, the flow advances to step S1100, and the CPU 33 performs another processing and then terminates a series of operations. Note that this processing in step S1100 is an image output process (image formation process) based on the printing request, and a detailed explanation thereof will be omitted.

On the other hand, if the CPU 33 determines in step S1001 that digital signature data is added to the document, the flow advances to step S1002. In step S1002, a counter (retry counter) which the CPU 33 uses to request the digital signature issue/authentication server 501 to perform authentication (or certification) later is reset to 0. After that, the flow advances to step S1003.

In step S1003, the CPU 33 starts communicating with the digital signature issue/authentication server 501 via the network controller 42. In this embodiment, the digital signature issue/authentication server 501 performs both issue and authentication of a digital signature. However, authentication and issue may also be performed by different servers.

The flow then advances to step S1004. If communication to the system of the digital signature issue/authentication server 501 cannot be performed because, e.g., the LAN 400 has a network failure or the system of the digital signature issue/authentication server 501 is down, the counter (retry counter) is counted up, and the flow advances to step S1009. Another possible cause of the inability to communicate with the system of the digital signature issue/authentication server 501 is that no stable communication is possible due to a traffic jam of the network. Still another possible cause is that the digital signature issue/authentication server 501 is operating but unable to return a response because it is busy.

In step S1009, the CPU 33 determines whether the retry counter has reached a count predetermined in the image input/output apparatus 1. This predetermined count is the upper limit of the retry, and is a value determined as a default in the image input/output apparatus 1. Alternatively, the predetermined count is a value input from the operation unit 7 by the manager or user of the image input/output apparatus 1, and stored in a nonvolatile storage means such as the hard disk 8 in the controller unit 110.

If the connection retry count has not reached the predetermined count in step S1009, the flow advances to step S1013 in order to retry connection after the elapse of a predetermined time. In step S1013, the CPU 33 resets its internal timer. Then, in step S1014, the CPU 33 waits for the elapse of the predetermined time. If the predetermined time has elapsed in step S1014, the flow returns to step S1004, and the CPU 33 retries to connect to the digital signature issue/authentication server 501.

On the other hand, if the connection retry count has reached the predetermined count in step S1009, the flow advances to step S1010, and the CPU 33 executes processing corresponding to a case in which connection to the digital signature issue/authentication server 501 is impossible. This processing will be described later.

If connection to the digital signature issue/authentication server 501 is normally performed in step S1004, the flow advances to step S1005, and the CPU 33 issues a digital signature certification request to the digital signature issue/authentication server 501 and receives the result via the network controller 42 (A4 and A5 in FIG. 5).

In step S1006, the flow branches in accordance with the certification result in step S1005. First, if the CPU 33 determines that the contents of the signature and document are not tampered on the basis of the certification result from the digital signature issue/authentication server 501, the flow advances to step S1007.

In step S1007, since the validity of the document (image data) and signature has been proved, the CPU 33 rasterizes (bitmap rasterization) the document (image data) into raster image data to be transferred to the printer 6. If the document (image data) is rasterized data, this bitmap rasterization process may also be skipped. If the document (image data) is compressed or encrypted data, expansion or decryption is performed where necessary. In step S1008, the CPU 33 transfers the raster image data rasterized in step S1007 to the marking unit 13 by DMA transfer by using the bus controller 34. As described earlier in the explanation of the printer 6, the marking unit 13 forms a visual image on a printing sheet, and terminates the process. As a consequence, an image is output.

On the other hand, if the CPU 33 determines that the contents of the signature and document are tampered on the basis of the certification result, in step S1005, from the digital signature issue/authentication server 501, the flow advances step S1010. If the term of validity of the digital signature has expired, the digital signature issue/authentication server 501 determines that the validity of the document cannot be certified. The flow may also advance to step S1010 in this case as well.

From step S1010, the CPU 33 executes processing corresponding to a case in which the digital signature issue/authentication server 501 cannot certify the validity of the document in step S1006, or processing corresponding to a case in which connection to the digital signature issue/authentication server 501 is impossible in step S1009. That is, in step S1010, the CPU 33 generates additional image data, and rasterizes the generated additional image data into a bitmap.

Figure 8:
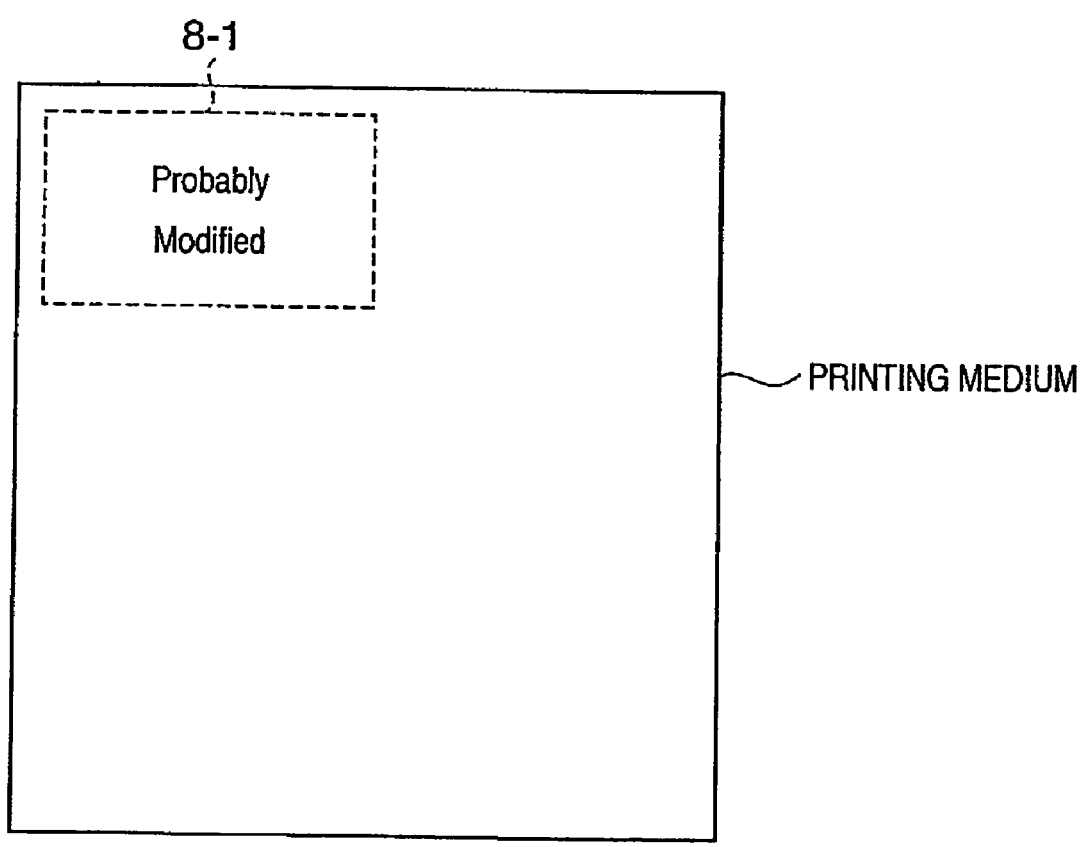
FIG. 8 is a view showing an example of an additional image indicating that a document is probably tampered.
Figure 9:
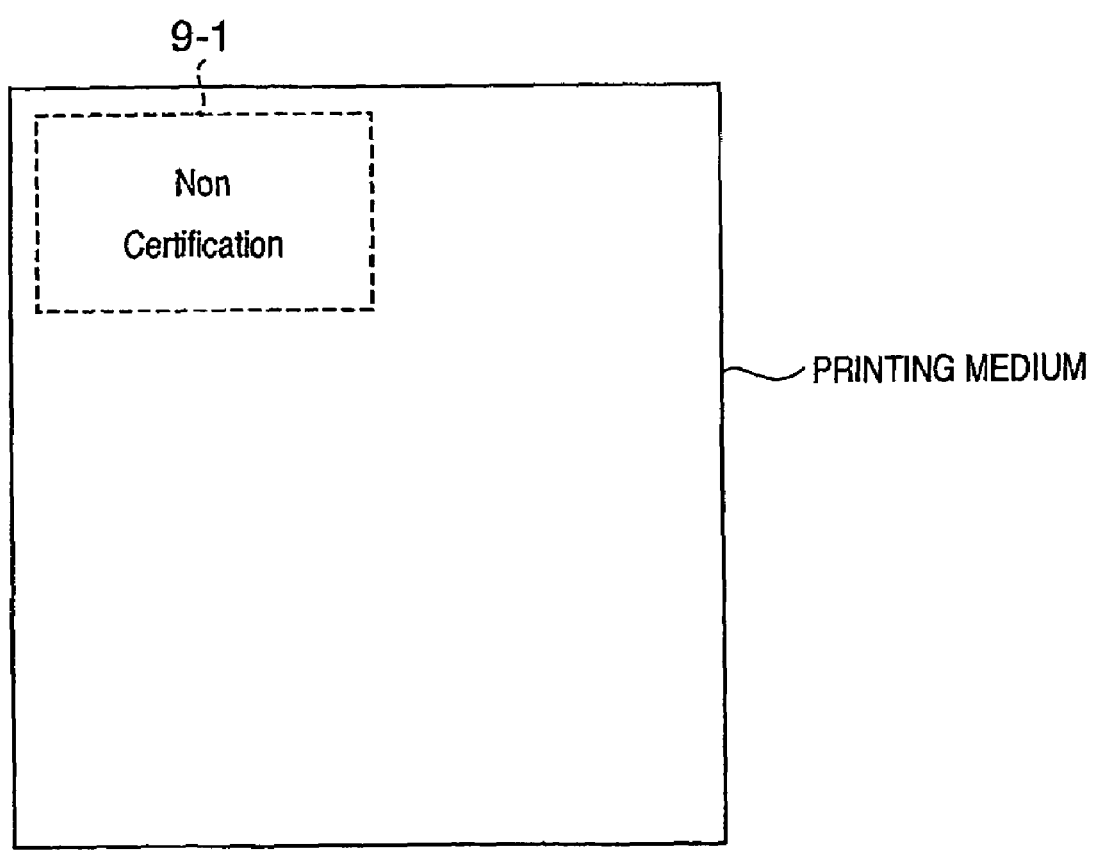
FIG. 9 is a view showing an example of an additional image indicating that the validity of a document cannot be certified.

[Additional Images: FIGS. 8 & 9]

An additional image formed by the additional image data is, e.g., an additional image as indicated by 8-1 in FIG. 8 which is generated when digital signature issue/authentication server 501 cannot certify the validity of a document, or an additional image as indicated by 9-1 in FIG. 9 which is generated when connection to the digital signature issue/authentication server-501 is impossible. More specifically, the additional image as indicated by 8-1 in FIG. 8 corresponds to a case in which the digital signature issue/authentication server 501 cannot certify the validity of a document, and indicates that the document is probably tampered. The additional image as indicated by 9-1 in FIG. 9 corresponds to a case in which connection to the digital signature issue/authentication server 501 is impossible, and indicates that the authenticity of a document cannot be certified. Each additional image is generated by the CPU 33. These additional images may also be generated and stored in the hard disk drive 8 of the controller unit 110 in advance, and read out where necessary. Note that FIG. 8 shows an example in which only the additional image 8-1 which is generated when the digital signature issue/authentication server 501 cannot certify the validity of a document is printed on a printing medium, and FIG. 9 shows an example in which only the additional image 9-1 which is generated when connection to the digital signature issue/authentication server 501 is impossible is printed on a printing medium.

Note that the additional image 9-1 may also be printed if the validity of a document cannot be certified because the term of validity of the digital signature has expired. It is also possible to use a message "the term of validity of the digital signature has expired" as an additional image.

Furthermore, a message "no digital signature is attached" may also be used as an additional image when a document which is found to be data with no digital signature in step S1001 is to be printed.

Then, in step S1011, the CPU 33 rasterizes the document (image data) received as described above into raster image data to be transferred to the printer 6. As explained in step S1007, it is also possible to skip the rasterization process in accordance with the type of document (image data), or perform expansion or decryption where necessary. When the document (image data) is to be rasterized into raster image data, if the user designates an output image corresponding to a case in which the digital signature issue/authentication server 501 cannot certify the validity of the document, or an output image corresponding to a case in which the document is probably tampered, the CPU 33 edits the document (image data) beforehand in accordance with the designation, and then rasterizes the edited data into raster image data. Assume that in the process in step S1011 of this embodiment, an output form by which the received document (image data) is output by the original color tone and the original size is preselected by the user.

Figure 17:
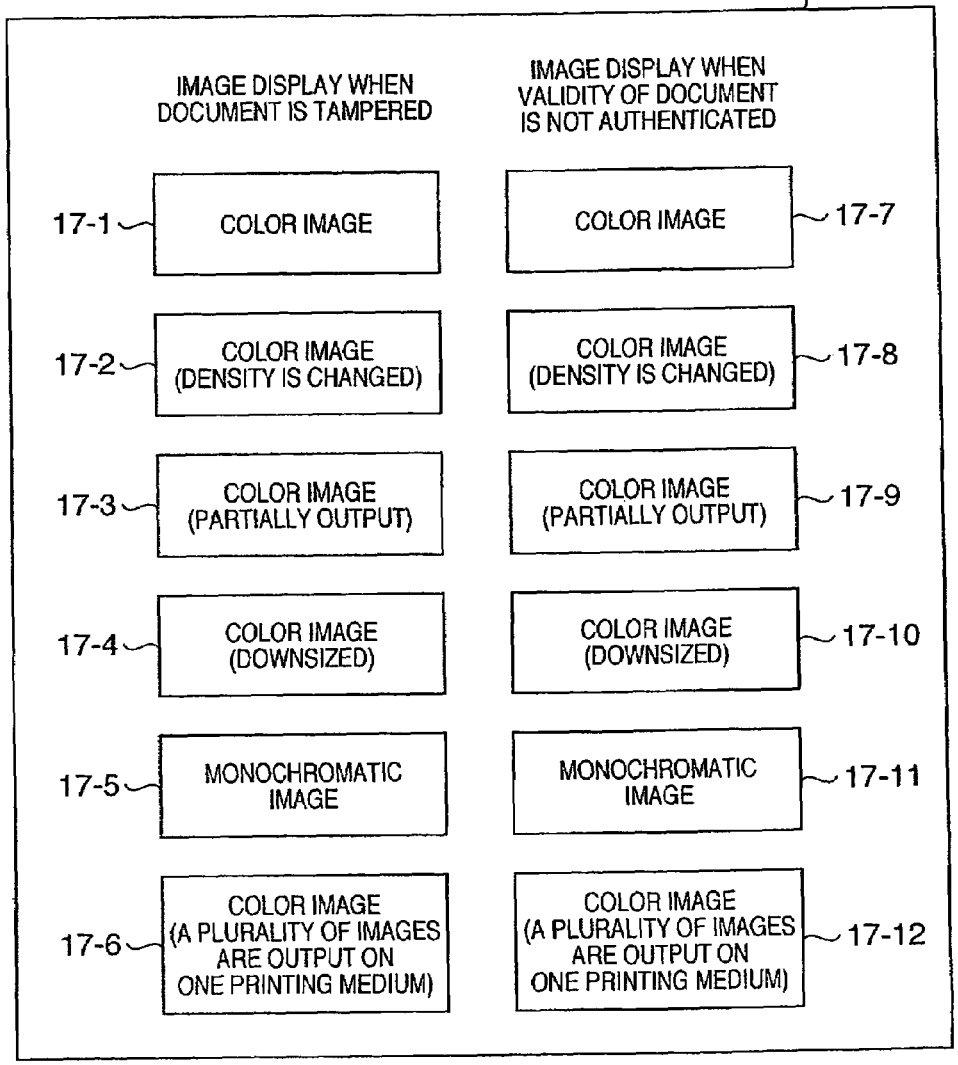
FIG. 17 is a view showing an example of an output image form selection menu.

[Image Output Forms: FIG. 17]

Output forms when the validity of a document cannot be certified will be explained below with reference to FIG. 17. This operation can be preset by the user when, e.g., the image input/output apparatus 1 is initialized.

In the image input/output apparatus 1, it is possible to display an output image form selection menu 17-0 shown in FIG. 17 on the liquid crystal panel of the operation unit 7, and set image display corresponding to a case in which the digital signature issue/authentication server 501 points out to the user that the document is probably tampered, or image display corresponding to a case in which the validity (authenticity) of the document cannot be certified because connection to the digital signature issue/authentication server 501 is impossible.

That is, if the user desires to output a color image having the same color tone and the same size as the received document (image data) when the document is probably tampered, he or she selects this image by pressing a button 17-1.

Similarly, if the user wants to change the density of the received document (image data), he or she selects this image by pressing a button 17-2. If the user desires to output only a portion of the received document (image data), he or she selects this image by pressing a button 17-3.

If the user wants to downsize the received document (image data), he or she selects this image by pressing a button 17-4. If the user desires to output the received document (image data) as a monochromatic image, he or she selects this image by pressing a button 17-5. If the user wants to downsize the received document (image data) and output a plurality of downsized images on one printing medium, he or she selects this image by pressing a button 17-6.

Figure 10:
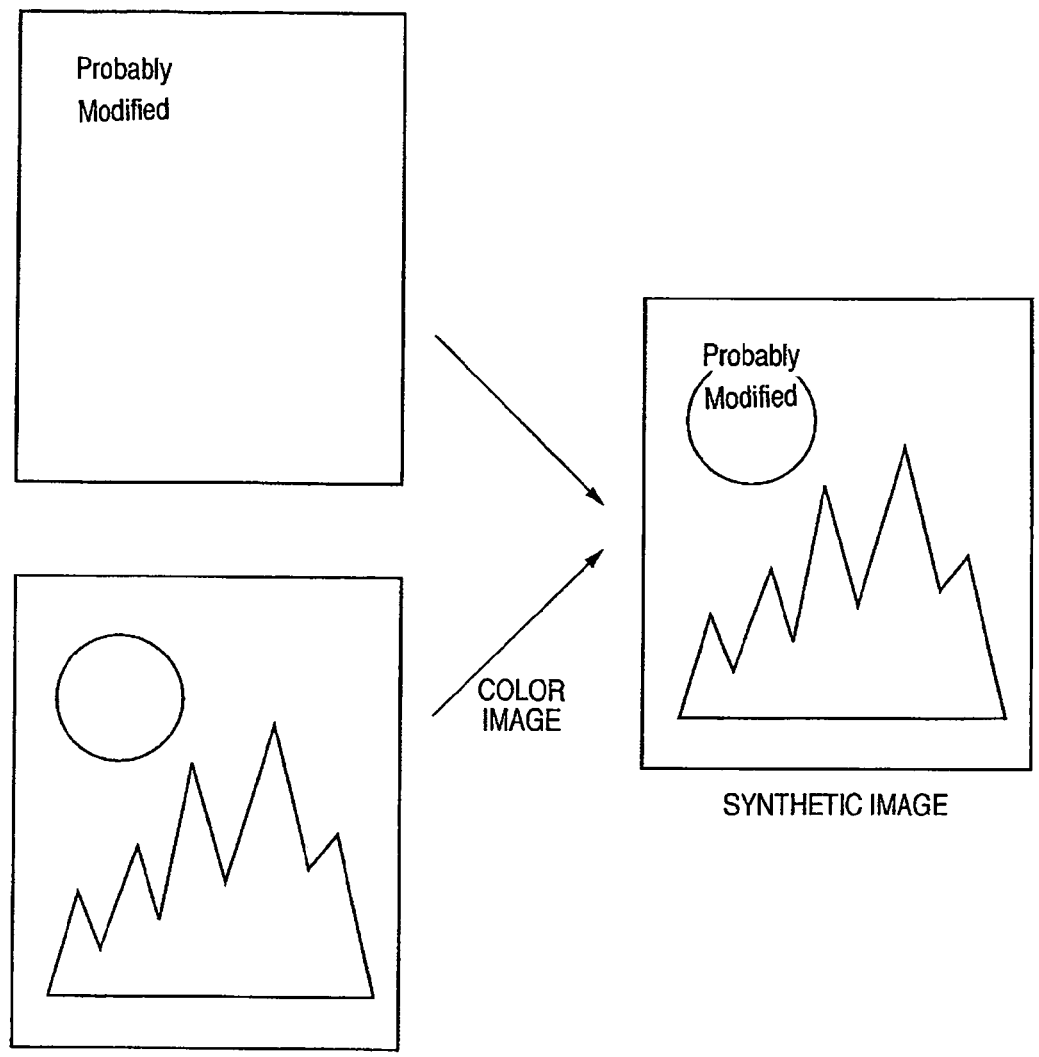
FIG. 10 shows an example of a synthetic image to which information indicating that a document is probably tampered is added.
Figure 11:
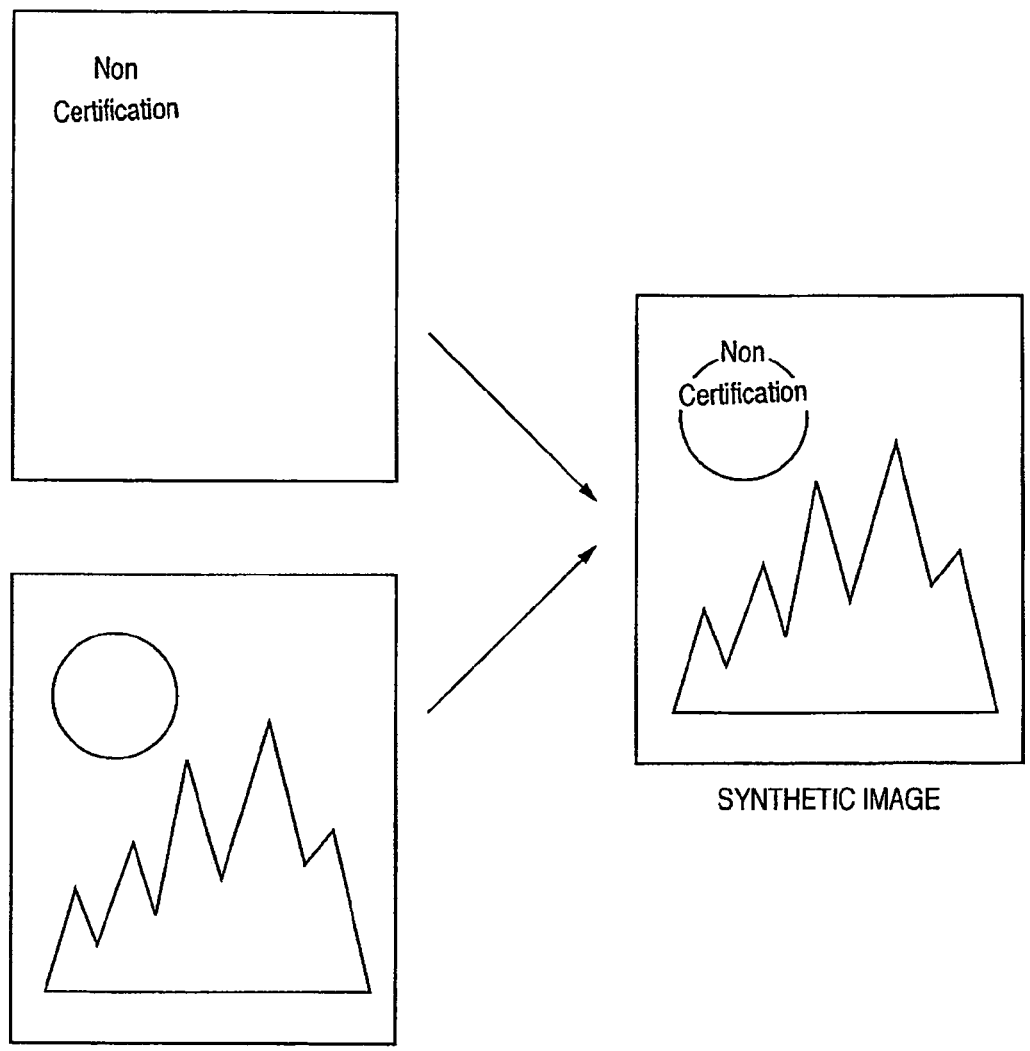
FIG. 11 shows an example of a synthetic image to which information indicating that the validity of a document cannot be certified is added.

[Synthetic Images: FIGS. 10 & 11]

Then, in step S1012, the CPU 33 forms synthetic image data by synthesizing the raster image data of the additional image data generated in step S1010 and the raster image data of the document (image data) edited in step S1011. In step S1008, the CPU 33 transfers raster image data of the synthetic image data to the printer 6, and outputs a synthetic image to which information indicating that the document is probably tampered is added, or a synthetic image to which information indicating that the validity of the document cannot be certified is added. FIGS. 10 and 11 illustrate examples of the synthetic image formed by this synthetic image data. FIG. 10 is an example of an image formed from synthetic image data synthesized by adding, to the image data, the additional image data shown in FIG. 8 which is generated when the digital signature issue/authentication server 501 cannot certify the validity of the document. FIG. 11 is an example of an image formed from synthetic image data synthesized by adding, to the image data, the additional image shown in FIG. 9 which is generated when connection to the digital signature issue/authentication server 501 is impossible.

[Other Synthetic Images: FIGS. 12-16]

Figure 12:
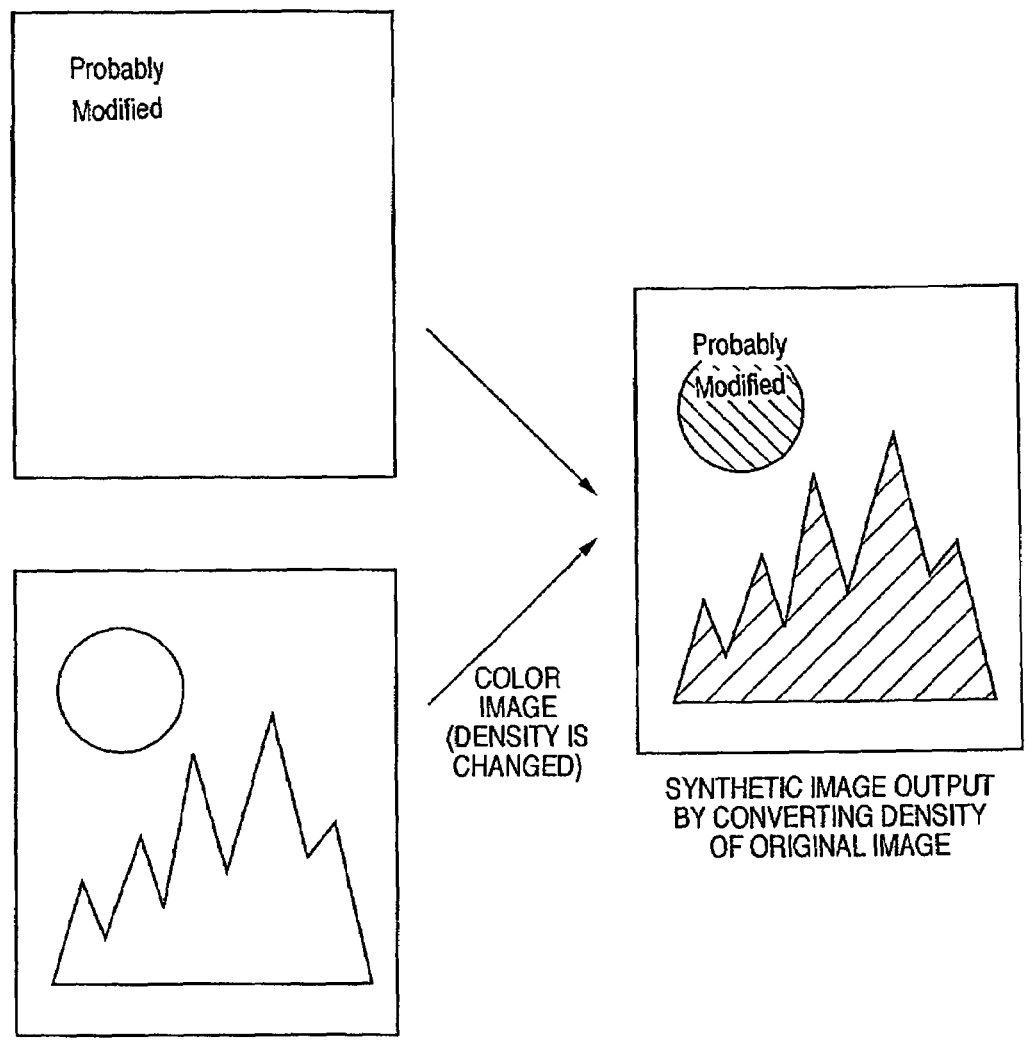
FIG. 12 is a view showing an example of a synthetic image (obtained by changing the density of the original image) to which information indicating that a document is probably tampered is added.

Note that in the process of step S1011→step S1012→step S1008, if the user designates one of the output images shown in FIG. 17 in advance, a synthetic image is formed from synthetic image data as described above in accordance with the designation. FIGS. 12 to 16 illustrate examples. That is, FIG. 12 is a view showing an example of a synthetic image synthesized by adding, to image data whose density is changed, the additional image data generated when the digital signature issue/authentication server 501 cannot certify the validity of the document.

Figure 13:
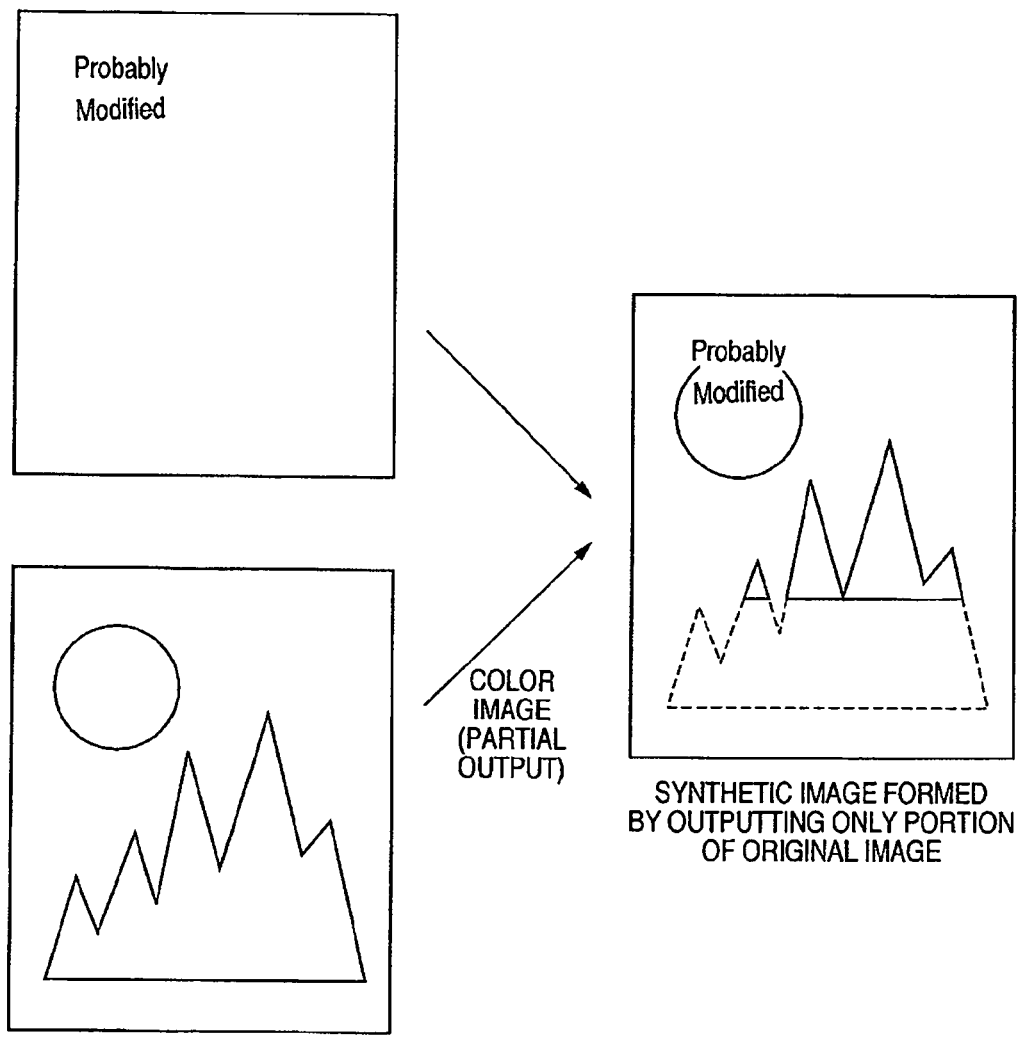
FIG. 13 is a view showing an example of a synthetic image (obtained by partially outputting the original image) to which information indicating that a document is probably tampered is added.

Likewise, FIG. 13 is a view showing an example of a synthetic image synthesized by adding, to image data which is so changed as to output only a portion of a color image, the additional image data generated when the digital signature issue/authentication server 501 cannot certify the validity of the document.

Figure 14:
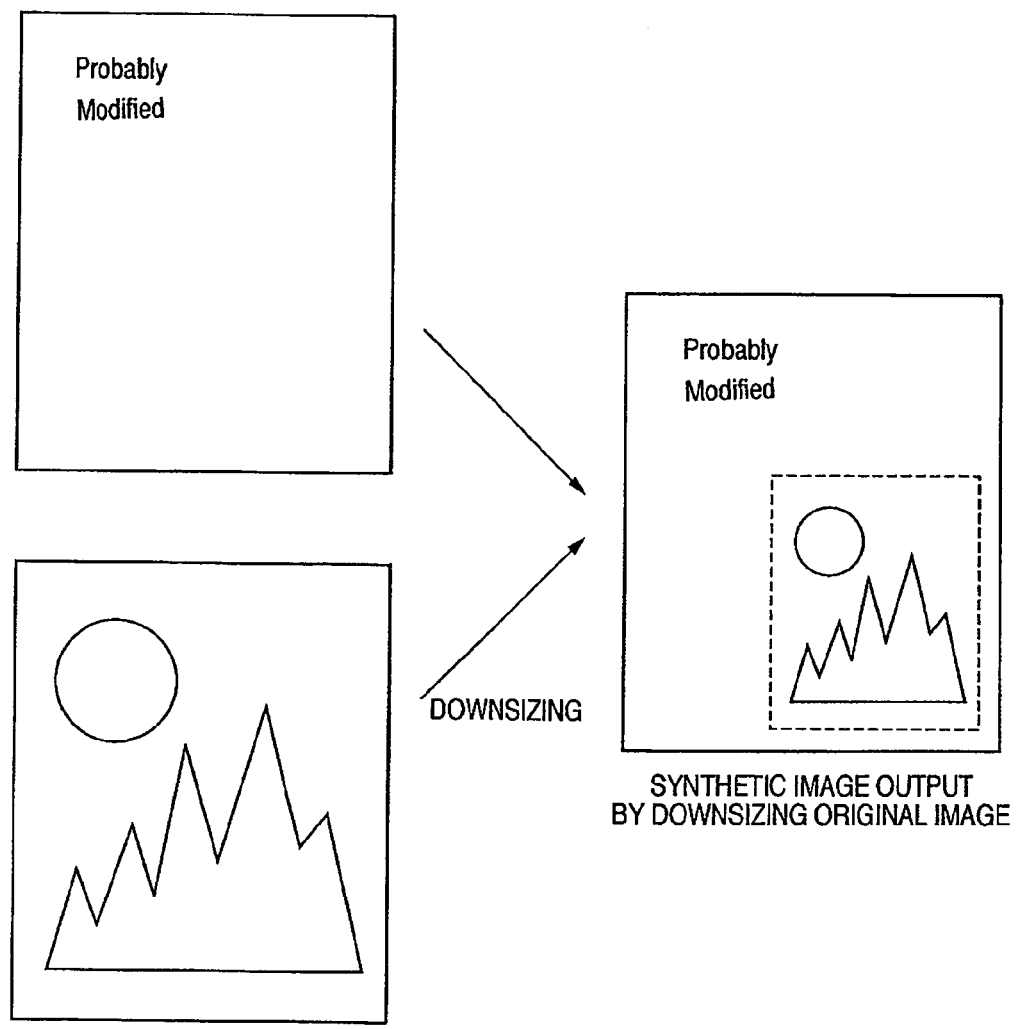
FIG. 14 is a view showing an example of a synthetic image (obtained by downsizing the original image) to which information indicating that a document is probably tampered is added.

FIG. 14 is a view showing an example of a synthetic image synthesized by adding, to image data which is so changed as to output a downsized color image, the additional image data generated when the digital signature issue/authentication server 501 cannot certify the validity of the document.

Figure 15:
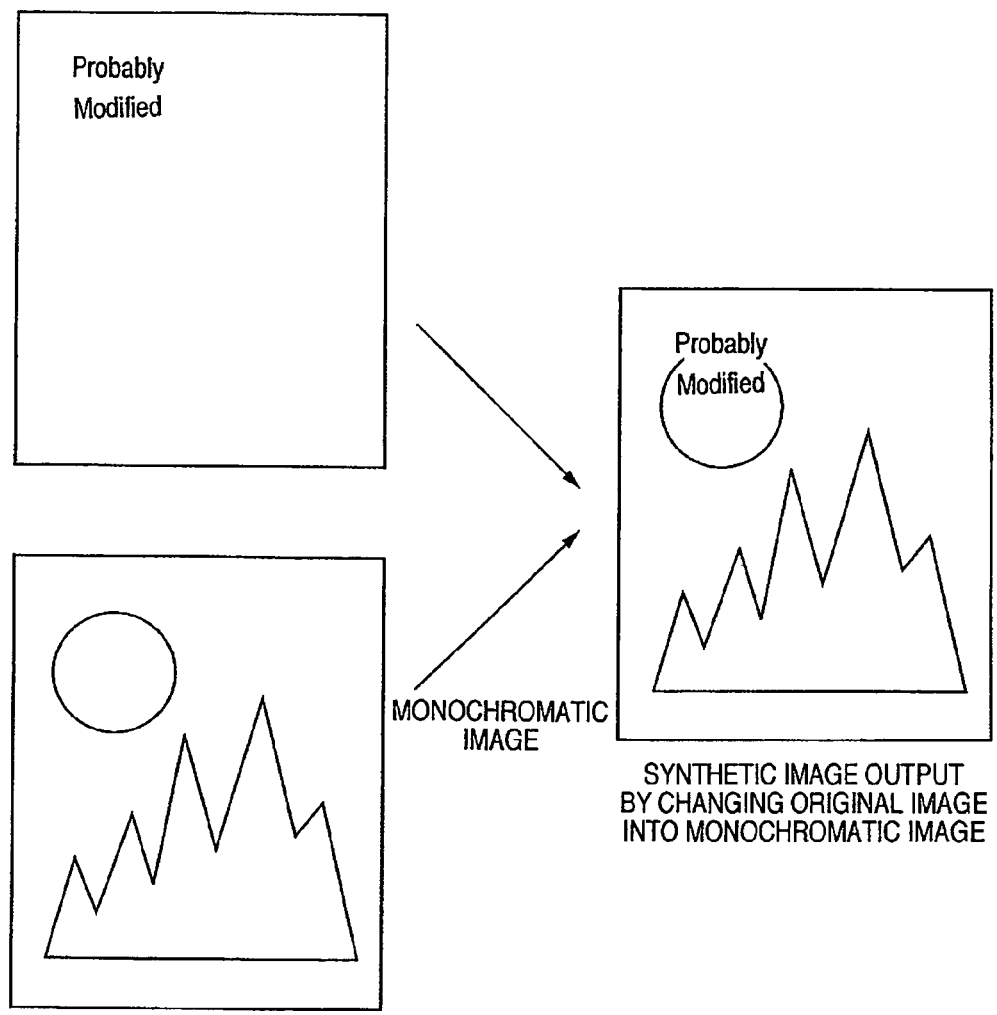
FIG. 15 is a view showing an example of a synthetic image (obtained by changing the original image into a monochromatic image) to which information indicating that a document is probably tampered is added.

FIG. 15 is a view showing an example of a synthetic image synthesized by adding, to image data which is so changed as to output a monochromatic image instead of a color image, the additional image data generated when the digital signature issue/authentication server 501 cannot certify the validity of the document.

Figure 16:
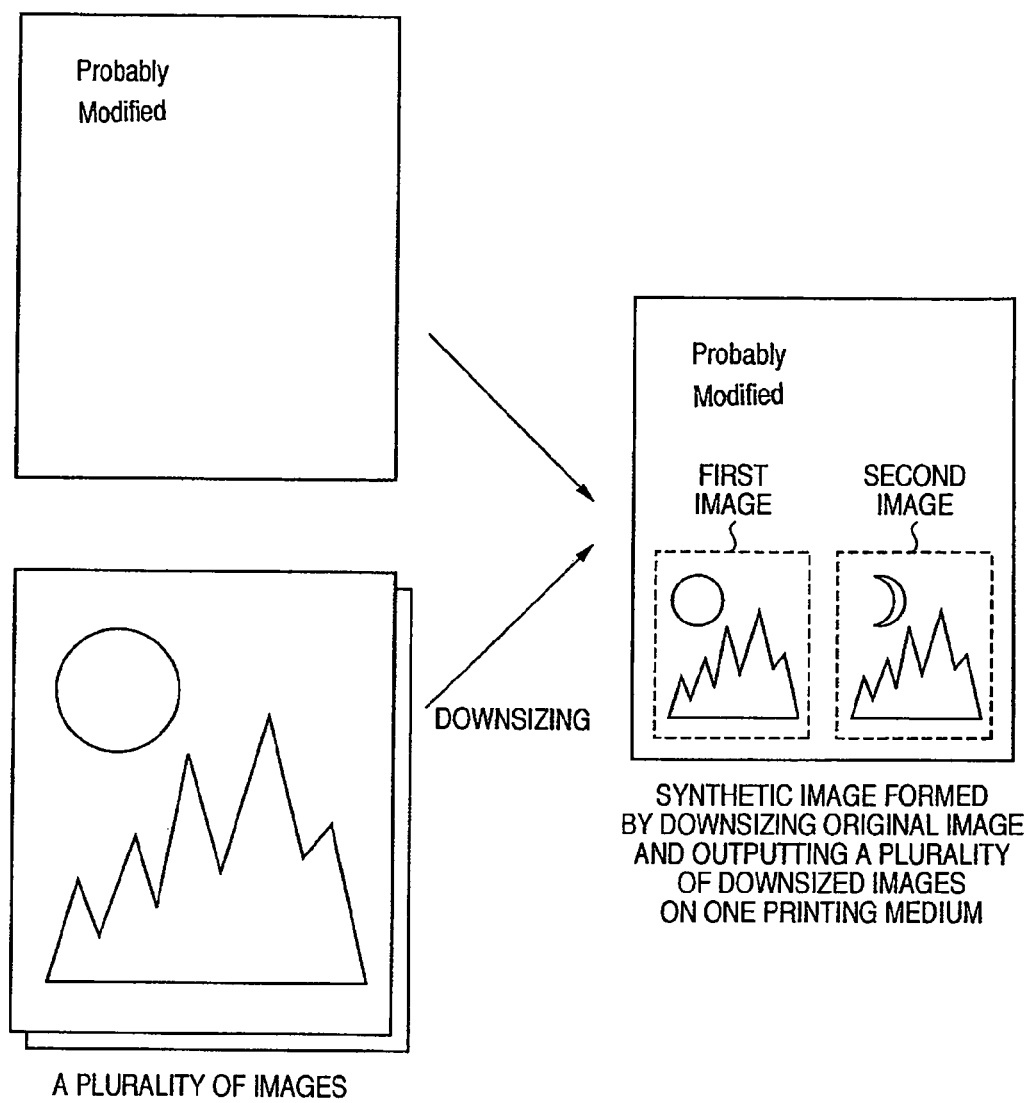
FIG. 16 is a view showing an example of a synthetic image (obtained by outputting a plurality of downsized original images onto one printing medium) to which information indicating that a document is probably tampered is added.

FIG. 16 is a view showing an example of a synthetic image synthesized by adding, to image data which is so changed as to output a plurality of downsized color images on one printing medium, the additional image data generated when the digital signature issue/authentication server 501 cannot certify the validity of the document.

[Block Diagram of Processing of CPU: FIG. 6]

The processing of the CPU 33 explained with reference to FIG. 7 is shown as a functional block diagram in FIG. 6. When authentication of the digital signature is normally performed by the digital signature issue/authentication server 501, an image data generating means 6-1 rasterizes the document (image data) into a bitmap image to generate raster image data, and an image output means 6-2 forms an image. In this case, nothing is added to the image, so the user can confirm that authentication of the digital signature is normally performed.

On the other hand, if certification of the digital signature is not performed by the digital signature issue/authentication server 501, or if certification of the digital signature shows that the document is tampered, an image editing means 6-3 performs image data editing (i.e., performs bitmap rasterization after density change, partial output, downsizing, or conversion to a monochromatic image explained above). In addition, an additional image generating means 6-4 generates additional image data and rasterizes the data into a bitmap. Furthermore, a synthetic image generating means 6-5 forms synthetic image data from the edited image data and the raster image data of the additional image data, and the image output means 6-2 forms a synthetic image. Since, therefore, information indicating that the validity of the document cannot be certified or the document is tampered is displayed as a visual image on the image, the user can confirm that authentication of the digital signature is not normally performed. It is also possible to avoid the possibility that the output product (printed product) is handled as a valid document, by not directly outputting the document for which validity certification cannot be performed or which is found to be tampered.

In this embodiment, the digital signature issue/authentication server 501 is explained as an external server of the image input/output apparatus 1. However, a digital signature issue/authentication function may also be incorporated into the image input/output apparatus 1. In an arrangement like this, a digital signature cannot be certified when, e.g., a digital signature certification operation cannot be executed because, e.g., the internal digital signature issue/authentication function of the image input/output apparatus 1 is not normally operating.

In the image forming apparatus of this embodiment as has been explained above, when an image is to be formed from image data with a digital signature by the image forming apparatus, if this image data is tampered, or if whether the image data is tampered is not certified (if the authenticity of the image data is not certified), this information can be added to the output image. On the basis of this information, therefore, the user can safely manage the image formed from the image data. Accordingly, the user can prevent careless distribution of the output image, and can carefully handle the output image by recognizing that the original image is probably tampered.

The present invention can be applied to a system constituted by a plurality of devices (e.g., a host computer, interface, reader, and printer) or to an apparatus (e.g., a copying machine or facsimile apparatus) comprising a single device.

Further, the object of the present invention can also be achieved by supplying a storage medium storing the program code of software for implementing the functions of the above embodiment to a system or apparatus, and reading out and executing the program code stored in the storage medium by a computer (or a CPU or MPU) of the system or apparatus.

In this case, the program code read out from the storage medium implements the functions of the embodiment, and the storage medium storing the program code and the program itself constitute the invention.

As this storage medium for supplying the program code, it is possible to use, e.g., a floppy disk, hard disk, optical disk, magnetooptical disk, CD-ROM, CD-R, magnetic tape, nonvolatile memory card, and ROM.

Also, besides the functions of the above embodiment are implemented by executing the readout program code by the computer, the present invention includes a case where an OS (Operating System) or the like running on the computer performs part or the whole of actual processing in accordance with designations by the program code and implements the functions of the embodiment by this processing.

Furthermore, the present invention also includes a case where the program code read out from the storage medium is written in a memory of a function expansion board inserted into the computer or of a function expansion unit connected to the computer, and, in accordance with designations by the program code, a CPU or the like of the function expansion board or function expansion unit performs part or the whole of actual processing and implements the functions of the above embodiment by this processing.

When the present invention is applied to the above storage medium, program codes corresponding to the flowcharts (shown in FIGS. 4 and 8) described above are stored in the storage medium.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-351512 filed on Dec. 3, 2004 and No. 2005-332060 filed on Nov. 16, 2005, which are hereby incorporated by reference herein.

What is claimed is:

1. An image forming apparatus connectable to a network, comprising:
   an identification unit adapted to identify whether a digital signature is added to image data;
   an authenticity inquiring unit adapted to inquire of a signature authentication server connected to said network about the authenticity of the image data, if said identification unit identifies that the digital signature is added to the image data;
   a determination unit adapted to determine whether the image data is valid, on the basis of information transmitted from said signature authentication server in response to the inquiry or the presence/absence of a response from said signature authentication server; and
   an image forming unit adapted to form synthetic image data by adding, to the image data, data corresponding to a determination result from said determination unit, and form a synthetic image from the synthetic image data,
   wherein if the determination result shows that the validity of the image data cannot be certified because no response is returned from said signature authentication server within a predetermined time, said image forming unit forms synthetic image data by adding data corresponding to the determination result to the image data, such that information indicating that the validity of the image cannot be certified is formed on the synthetic image.

2. The apparatus according to claim 1, wherein the digital signature includes a time stamp.

3. The apparatus according to claim 1, wherein if the determination result shows that the image data is found to be a fake by said signature authentication server, said image forming unit forms synthetic image data by adding data corresponding to the determination result to the image data, such that information indicating that the image is probably tampered is formed on the synthetic image.

4. The apparatus according to claim 1, wherein if the determination result shows that the image data is found to be authentic data by said signature authentication server, said image forming unit does not form any synthetic image data, such that an image is formed only from the image data.

5. The apparatus according to claim 3, wherein if the determination result shows that the image data is found to be a fake by said signature authentication server, or that the validity of the image data cannot be certified, said image forming unit changes the image data into monochromatic image data, and forms synthetic image data by adding data corresponding to the determination result to the monochromatic image data.

6. The apparatus according to claim 3, wherein if the determination result shows that the image data is found to be a fake by said signature authentication server, or that the validity of the image data cannot be certified, said image forming unit extracts a portion of the image data, and forms synthetic image data by adding data corresponding to the determination result to the extracted image data.

7. The apparatus according to claim 3, wherein if the determination result shows that the image data is found to be a fake by said signature authentication server, or that the validity of the image data cannot be certified, said image forming unit downsizes the image data, and forms synthetic image data by adding data corresponding to the determination result to the downsized image data.

8. The apparatus according to claim 3, wherein if the determination result shows that the image data is found to be a fake by said signature authentication server, or that the validity of the image data cannot be certified, said image forming unit changes a density of the image data, and forms synthetic image data by adding data corresponding to the determination result to the image data having the changed density.

9. The apparatus according to claim 3, wherein if the determination result shows that the image data is found to be a fake by said signature authentication server, or that the validity of the image data cannot be certified, said image forming unit downsizes the image data, performs processing such that a plurality of downsized image data are printed on one printing medium, and forms synthetic image data by adding data corresponding to the determination result.

10. A control method of an image forming apparatus connectable to a network, comprising:
    an identification step of identifying whether a digital signature is added to image data;
    an authenticity inquiring step of inquiring of a signature authentication server connected to the network about the authenticity of the image data, if the digital signature is identified to be added to the image data in the identification step;
    a determination step of determining whether the image data is valid, on the basis of information transmitted from the signature authentication server in response to the inquiry or the presence/absence of a response from the signature authentication server; and
    an image formation step of forming synthetic image data by adding, to the image data, data corresponding to a determination result from the determination step, and forming a synthetic image from the synthetic image data,
    wherein if the determination result shows that the validity of the image data cannot be certified because no response is returned from the signature authentication server within a predetermined time, in the image formation step, synthetic image data is formed by adding data corresponding to the determination result to the image data, such that information indicating that the validity of the image cannot be certified is formed on the synthetic image.

11. A computer-readable storage medium storing a control program that when executed by a computer causes the computer to control an image forming apparatus connectable to a network, the control program comprising:
- a program code of an identification step of identifying whether a digital signature is added to image data;
- a program code of an authenticity inquiring step of inquiring of a signature authentication server connected to the network about the authenticity of the image data, if the digital signature is identified to be added to the image data in the identification step;
- a program code of a determination step of determining whether the image data is valid, on the basis of information transmitted from the signature authentication server in response to the inquiry or the presence/absence of a response from the signature authentication server; and
- a program code of an image formation step of forming synthetic image data by adding, to the image data, data corresponding to a determination result from the determination step, and forming a synthetic image from the synthetic image data wherein if the determination result shows that the validity of the image data cannot be certified because no response is returned from the signature authentication server within a predetermined time, in the image formation step, synthetic image data is formed by adding data corresponding to the determination result to the image data, such that information indicating that the validity of the image cannot be certified is formed on the synthetic image.

* * * * *